United States Patent
Tomura et al.

(10) Patent No.: US 11,575,143 B2
(45) Date of Patent: Feb. 7, 2023

(54) FLUID CONFLUENCE JOINT

(71) Applicant: TOYOTA JIDOSHA KABUSHIKI KAISHA, Toyota (JP)

(72) Inventors: Takanao Tomura, Nishio (JP); Yushi Suzuki, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 549 days.

(21) Appl. No.: 16/596,183

(22) Filed: Oct. 8, 2019

(65) Prior Publication Data
US 2020/0119386 A1 Apr. 16, 2020

(30) Foreign Application Priority Data

Oct. 12, 2018 (JP) .............................. JP2018-193006

(51) Int. Cl.
| | | |
|---|---|---|
| *H01M 8/04082* | (2016.01) | |
| *H01M 8/02* | (2016.01) | |
| *H01M 8/2465* | (2016.01) | |
| *H01M 8/04089* | (2016.01) | |
| *H01M 8/04014* | (2016.01) | |

(52) U.S. Cl.
CPC ..... *H01M 8/2465* (2013.01); *H01M 8/04014* (2013.01); *H01M 8/04089* (2013.01); *H01M 8/04201* (2013.01)

(58) Field of Classification Search
CPC ........... H01M 8/2465; H01M 8/04014; H01M 8/04089; H01M 8/04201; H01M 8/04186; H01M 8/04276; H01M 8/188; H01M 8/02; H01M 8/0258; Y02E 60/50

USPC .......................................................... 429/428
See application file for complete search history.

(56) References Cited

U.S. PATENT DOCUMENTS

| | | | |
|---|---|---|---|
| 2003/0124407 A1 | 7/2003 | Tanaka et al. | |
| 2005/0247618 A1 | 11/2005 | Berger et al. | |
| 2005/0247619 A1 | 11/2005 | Berger et al. | |
| 2006/0254906 A1* | 11/2006 | Numata | ............ H01M 8/04231 204/258 |
| 2010/0092812 A1* | 4/2010 | Ishiguro | .............. H01M 8/0662 429/425 |
| 2015/0111116 A1 | 4/2015 | Hotta et al. | |
| 2019/0099727 A1* | 4/2019 | Ekdunge | ........... B01F 25/43151 |

FOREIGN PATENT DOCUMENTS

| | | |
|---|---|---|
| CN | 202844899 U | 4/2013 |
| DE | 102004022311 A1 | 9/2005 |
| DE | 102004022312 A1 | 9/2005 |
| DE | 102017220800 A1 | 5/2019 |

(Continued)

*Primary Examiner* — Christian Roldan
(74) *Attorney, Agent, or Firm* — Finnegan, Henderson, Farabow, Garrett & Dunner, LLP

(57) ABSTRACT

At a position between a fuel offgas inlet portion and a fuel gas inlet portion in a main body portion in the facing direction where a first end faces a second end, a fluid confluence joint is provided with at least either one of (i) at least one step formed over a whole circumference of an inner wall of the main body portion by reducing the passage sectional area on a fuel gas passage portion side to be smaller than the passage sectional area on a confluence passage portion side, and (ii) at least one partition wall formed over the whole circumference so as to project inwardly from the inner wall of the main body portion.

7 Claims, 6 Drawing Sheets

(56) References Cited

FOREIGN PATENT DOCUMENTS

| | | |
|---|---|---|
| JP | 2003-203669 | 7/2003 |
| JP | 2009-099380 | 5/2009 |
| JP | 2013-251178 | 12/2013 |
| JP | 2014-216101 | 11/2014 |
| JP | 2018-060757 A | 4/2018 |
| JP | 2018060757 * | 4/2018 |

* cited by examiner

FLUID CONFLUENCE JOINT

INCORPORATION BY REFERENCE

The disclosure of Japanese Patent Application No. 2018-193006 filed on Oct. 12, 2018 including the specification, drawings and abstract is incorporated herein by reference in its entirety.

BACKGROUND

1. Technical Field

This disclosure relates to the technology of a fluid confluence joint for a fuel cell at which a fuel gas joins with a fuel offgas.

2. Description of Related Art

There has been known a fluid confluence joint (a confluence portion) at which a fuel gas to be supplied to a fuel cell joins with a fuel offgas discharged from the fuel cell (Japanese Unexamined Patent Application Publication No. 2013-251178 (JP 2013-251178 A)). The fluid confluence joint guides a fuel mixture of the fuel gas and the fuel offgas after confluence to the fuel cell disposed outside the fluid confluence joint.

SUMMARY

In the fluid confluence joint, liquid water might be introduced into the fluid confluence joint together with the fuel offgas. In a case where the liquid water enters a region (an entry region), in the fluid confluence joint, in which the fuel gas flows, when the liquid water thus entering stays in the entry region, it might become difficult to stably supply the fuel gas to the fuel cell. Accordingly, the technology that can reduce the possibility that the liquid water enters the entry region in the fluid confluence joint is desired.

(1) A first aspect of this disclosure relates to a fluid confluence joint at which a fuel gas to be supplied to a fuel cell joins with a fuel offgas discharged from the fuel cell. The fluid confluence joint includes a main body portion including a first end and a second end facing the first end, the second end having an opening formed to guide a fuel mixture of the fuel gas and the fuel offgas. The main body portion includes: (i) a confluence passage portion in which the fuel gas joins with the fuel offgas, the confluence passage portion having a circular passage section; and (ii) a fuel gas passage portion disposed on a side closer to the first end than the confluence passage portion. The main body portion includes: (a) a fuel offgas inlet portion configured to cause the fuel offgas to flow into the confluence passage portion so that the fuel offgas swirls in the confluence passage portion; (b) a fuel gas inlet portion configured to cause the fuel gas to flow into the fuel gas passage portion; and (c) at least either one of (i) at least one step formed over a whole circumference of an inner wall of the main body portion by reducing the passage sectional area of the main body portion on the fuel gas passage portion side to be smaller than the passage sectional area of the main body portion on the confluence passage portion side, and (ii) at least one partition wall formed over the whole circumference so as to project inwardly from the inner wall of the main body portion. The at least either one of the at least one step and the at least one partition wall is formed at a position between the fuel offgas inlet portion and the fuel gas inlet portion in the main body portion in the facing direction where the first end faces the second end. In this aspect, the fuel offgas flows into the confluence passage portion so that the fuel offgas swirls in the confluence passage portion. Accordingly, in a case where liquid water is included in the fuel offgas, the liquid water can be pressed against the inner wall of the confluence passage portion. In a case where the liquid water pressed against the inner wall of the confluence passage portion is to move to the fuel gas inlet portion side, the liquid water directed toward the fuel gas inlet portion can be caught by the step or the partition wall. Accordingly, it is possible to reduce a possibility that the liquid water enters an entry region for the fuel gas, including the fuel gas inlet portion.

(2) The confluence passage portion may have a shape in which a passage diameter increases toward the second end. In this configuration, in a case where the fluid confluence joint is disposed so that the central axis of the confluence passage portion is horizontal, a wall placed on the lower side in the inner wall of the confluence passage portion is inclined to be placed downward as it goes toward the second end. This can promote the liquid water attached to the wall placed on the lower side to move to the second end by gravity. This makes it possible to further reduce the possibility that the liquid water enters the entry region.

(3) The at least one step may include a plurality of steps. In this configuration, the steps are formed, thereby making it possible to further reduce the possibility that the liquid water enters the entry region for the fuel gas.

(4) The at least one partition wall may include a plurality of partition walls. In this configuration, the partition walls are formed, thereby making it possible to further reduce the, possibility that the liquid water enters the entry region for the fuel gas.

(5) The at least one step may be inclined toward the second end as the at least one step extends in an inward direction of the main body portion. In this configuration, the step is inclined toward the second end as it extends in the inward direction of the main body portion. Accordingly, it is possible to further restrain the liquid water from climbing over the step. This makes it possible to further reduce the possibility that the liquid water enters the entry region.

(6) The at least one partition wall may be inclined toward the second end as the at least one partition wall extends in an inward direction of the main body portion. In this configuration, the partition wall is inclined toward the second end as it extends in the inward direction of the main body portion. Accordingly, it is possible to further restrain the liquid water from climbing over the partition wall. This makes it possible to further reduce the possibility that the liquid water enters the entry region.

(7) The dimension of a part of the at least one step may be different from the dimension of the other part of the at least one step. In this configuration, the dimension of a part, of the step, where the liquid water easily gathers is made larger than the dimension of the other part, for example. This makes it possible to further reduce the possibility that the liquid water enters the entry region for the fuel gas.

(8) The projection amount of a part of the at least one partition wall may be different from the projection amount of the other part of the at least one partition wall. In this configuration, the projection amount of a part, of the partition wall, where the liquid water easily gathers is made larger than that of the other part of the partition wall. This makes it possible to further reduce the possibility that the liquid water enters the entry region for the fuel gas.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A. First Embodiment

Figure 1:
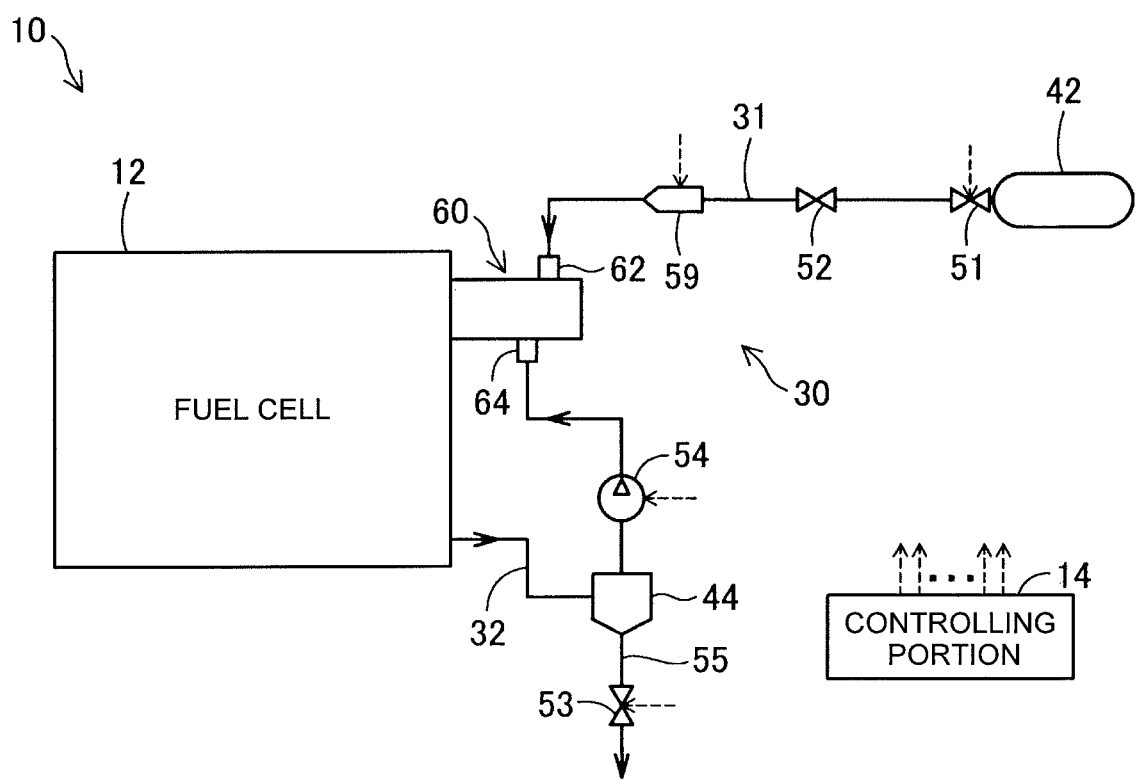
FIG. 1 illustrates a fuel cell system.

FIG. 1 is a view to describe a fuel cell system 10 of this disclosure. The fuel cell system 10 is, for example, provided in a vehicle and is used as a power generator configured to drive a driving motor for the vehicle. The fuel cell system 10 includes a controlling portion 14, a fuel cell 12, and a fuel gas supply-discharge system 30. The controlling portion 14 controls the operation of the fuel cell system 10.

The fuel cell 12 is a solid polymer fuel cell configured to generate electric power by an electrochemical reaction between oxygen and hydrogen upon receipt of the supply of an oxidant gas and a fuel gas as reactant gases. In the present embodiment, the oxidant gas is air, and the fuel gas is a hydrogen gas. The fuel cell 12 has a stack structure in which a plurality of single cells is laminated. Each of the single cells is a power generation element that can also generate electric power by itself. The single cell includes a membrane electrode assembly and two separators between which the membrane electrode assembly is sandwiched. The membrane electrode assembly includes an electrolyte membrane, an anode disposed on a first surface of the electrolyte membrane, and a cathode disposed on a second surface of the electrolyte membrane. The electrolyte membrane is a solid polymer thin film exhibiting an excellent proton conductivity in a wet condition in which water is included in the electrolyte membrane. An outer peripheral end of each of the single cells is provided with manifolds (not shown) for the reactant gases, the manifolds extending in the laminating direction of the single cells and branched to be connected to respective power generation portions of the single cells. The single cells are tightened in a sandwiched state in the laminating direction in a state where the single cells are laminated.

The fuel gas supply-discharge system 30 includes a fuel gas tank 42, a fuel gas supply passage 31, an on-off valve 51, a regulator 52, and an injector 59. In the fuel gas tank 42, a high-pressure hydrogen gas is accumulated, for example. The fuel gas supply passage 31 is a pipe through which the fuel gas directed to the fuel cell 12 from the fuel gas tank 42 flows. The on-off valve 51 changes execution and stop of the supply of the fuel gas from the fuel gas tank 42. The regulator 52 adjusts the pressure of the fuel gas in the upstream from the injector 59. The injector 59 is an on-off valve driven electromagnetically in accordance with a driving period or a valve-opening time set by the controlling portion 14 and is configured to adjust a supply amount of the fuel gas to be supplied to the fuel cell 12.

The fuel gas supply-discharge system 30 further includes a fuel offgas circulation passage 32, a gas-liquid separator 44, a circulating pump 54, an exhaust gas and liquid discharge valve 53, and an exhaust gas and liquid discharge passage 55.

The fuel offgas circulation passage 32 is a pipe configured to guide the fuel offgas discharged from the fuel cell 12 to a fluid confluence joint 60 (described below) so as to circulate the fuel offgas. The gas-liquid separator 44 is provided in the fuel offgas circulation passage 32 and is configured to separate liquid water from the fuel offgas in which the liquid water is mixed. The circulating pump 54 circulates the fuel offgas in the fuel offgas circulation passage 32 toward the fuel gas supply passage 31. The exhaust gas and liquid discharge passage 55 is a pipe via which a discharge port of the gas-liquid separator 44 from which the liquid water is discharged communicates with the outside. The exhaust gas and liquid discharge valve 53 is disposed in the exhaust gas and liquid discharge passage 55 and is configured to open and close the exhaust gas and liquid discharge passage 55. When the exhaust gas and liquid discharge valve 53 enters an opened state, nitrogen gas that is an impurity gas included in the fuel offgas and the liquid water are discharged to the outside via the exhaust gas and liquid discharge passage 55.

The fuel cell system 10 further includes the fluid confluence joint 60. The fuel gas supply passage 31 and the fuel offgas circulation passage 32 are connected to the fluid confluence joint 60. More specifically, the fuel gas supply passage 31 is connected to a fuel gas connecting portion 62 of the fluid confluence joint 60, and the fuel offgas circulation passage 32 is connected to a fuel offgas connecting portion 64 of the fluid confluence joint 60. The fluid confluence joint 60 is made of metal, such as stainless steel, or synthetic resin. At the fluid confluence joint 60, the fuel gas to be supplied to the fuel cell 12 joins with the fuel offgas discharged from the fuel cell 12. The fuel mixture of the fuel gas and the fuel offgas after confluence is supplied to the fuel cell 12. In the following description, the upstream and the downstream are defined based on the flow direction of the fuel mixture toward the fuel cell 12, and the side toward the fuel cell 12 is taken as the downstream.

Further, the fuel cell system 10 includes an oxidant gas supply-discharge system (not shown) configured to supply an oxidant gas to the fuel cell 12 and discharge an oxidant offgas from the fuel cell 12, and a refrigerant circulatory system (not shown) configured to adjust the .temperature of the fuel cell 12 by circulating a refrigerant such as water through the fuel cell 12.

Figure 2:
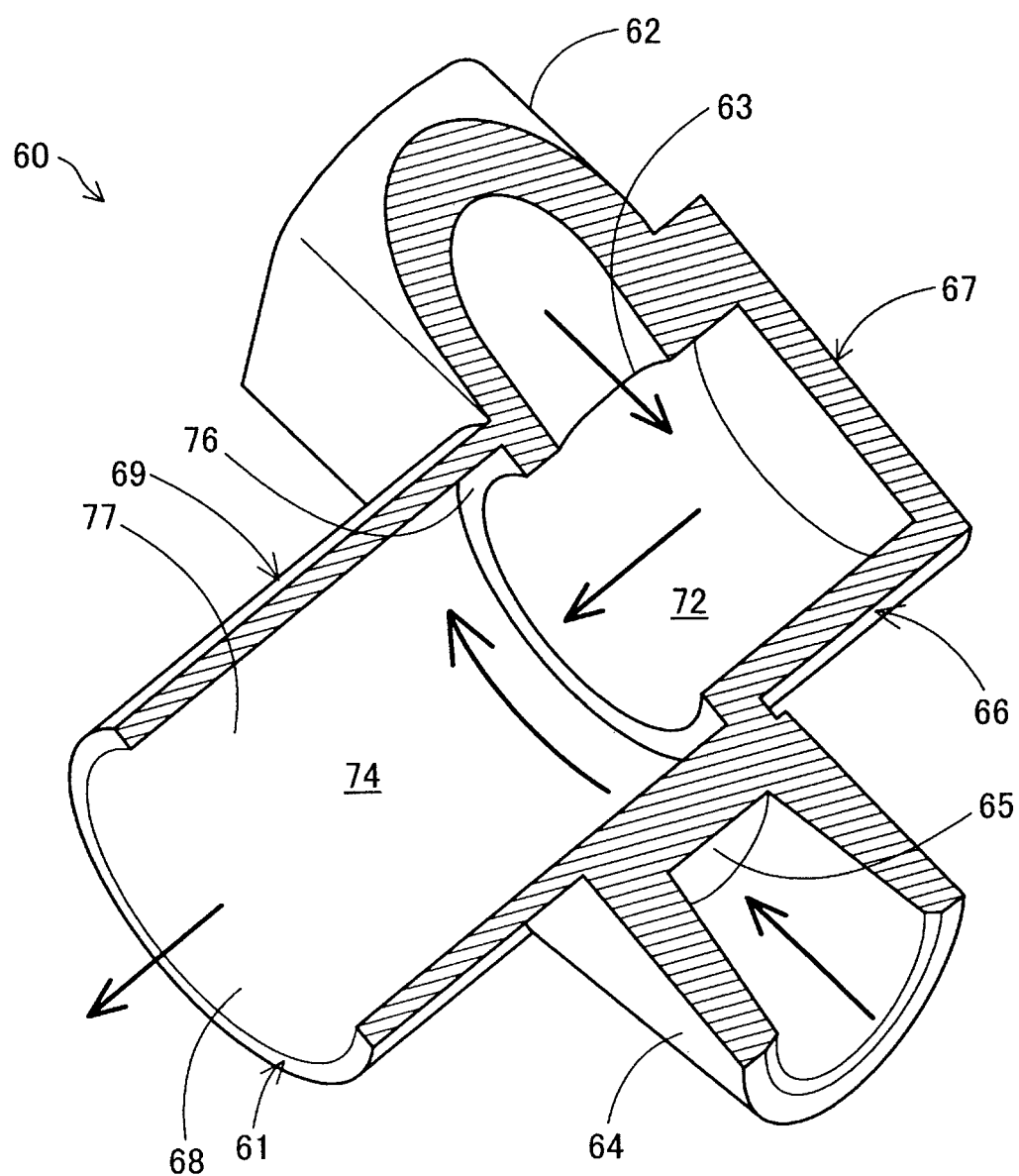
FIG. 2 is a partially cut away perspective view of a fluid confluence joint.
Figure 3:
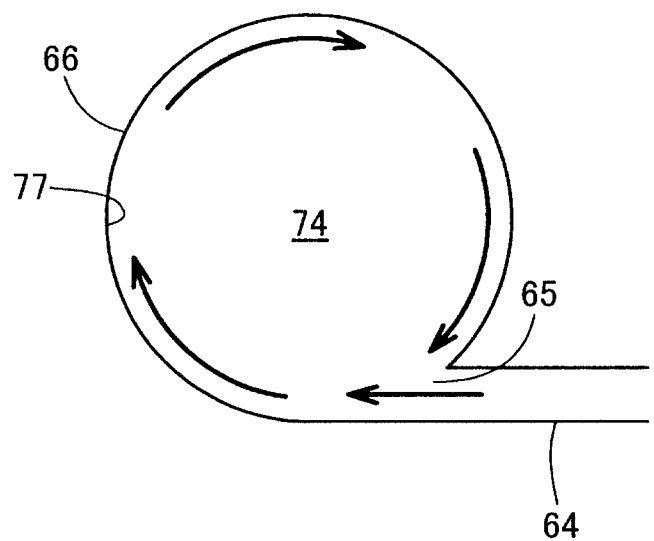
FIG. 3 is a schematic view to describe the flow of a fuel offgas introduced from a fuel offgas connecting portion.

FIG. 2 is a partially cut away perspective view of the fluid confluence joint 60. FIG. 3 is a schematic view to describe the flow of the fuel offgas introduced from the fuel offgas connecting portion 64. In FIGS. 2 and 3, a flow of the gas inside the fluid confluence joint 60 is indicated by an arrow. As illustrated in FIG. 2, the fluid confluence joint 60 includes a main body portion 66, the fuel gas connecting portion 62, and the fuel offgas connecting portion 64.

The main body portion 66 has a bottomed tubular shape in which a first end 67 that is an upstream end forms a bottom wall. The main body portion 66 includes the first end 67 and a second end (a downstream end) 61 facing the first end 67. The second end 61 includes an opening 68 via which the fuel mixture of the fuel gas and the fuel offgas is guided to the fuel cell 12. The main body portion 66 includes a fuel gas passage portion 72 and a confluence passage portion 74. In a case where the fluid confluence joint 60 is assembled to the fuel cell system 10 and the vehicle equipped with the fuel cell system 10 is placed on a horizontal plane, for example, the fluid confluence joint 60 is disposed such that the central axis of the confluence passage portion 74 is generally horizontal.

The confluence passage portion 74 is a passage where the fuel gas joins with the fuel offgas. The passage section of the confluence passage portion 74 is circular. The downstream end of the confluence passage portion 74 is the second end 61 of the main body portion 66. The fuel gas passage portion 72 is placed in the upstream from the confluence passage portion 74. In the present embodiment, the downstream end of the fuel gas passage portion 72 is connected to the upstream end of the confluence passage portion 74. The passage section of the fuel gas passage portion 72 is circular. The upstream end of the fuel gas passage portion 72 is the first end 67 of the main body portion 66.

The fuel offgas connecting portion 64 is connected to a side wall 69 of the tubular main body portion 66. One end of the fuel offgas connecting portion 64 is a fuel offgas inlet portion 65 formed on the side wall 69 of the main body portion 66. The fuel offgas inlet portion 65 has an opening via which the fuel offgas flowing through the fuel offgas circulation passage 32 flows into the confluence passage portion 74. The fuel offgas inlet portion 65 causes the fuel offgas to flow into the confluence passage portion 74 so that the fuel offgas swirls in the confluence passage portion 74. More specifically, as illustrated in FIG. 3, the fuel offgas inlet portion 65 is configured to cause the fuel offgas to flow into the confluence passage portion 74 along the tangential direction of the circular passage section. Hereby, the fuel offgas flowing into the confluence passage portion 74 swirls along an inner wall 77 and flows toward the second end 61 (FIG. 2). The liquid water, in the fuel offgas, that cannot be separated by the gas-liquid separator 44 has a specific gravity higher than that of the fuel offgas, so that the liquid water is pressed against the inner wall 77 and attached to the inner wall 77. Hereby, the fuel offgas can be separated from the liquid water. Note that the fuel offgas inlet portion 65 is not limited to the present embodiment, provided that the fuel offgas inlet portion 65 can cause the fuel offgas to flow into the confluence passage portion 74 so that the fuel offgas swirls in the confluence passage portion 74. For example, the fuel offgas inlet portion 65 may be configured to cause the fuel offgas to flow into the confluence passage portion 74 from a direction slightly deviating from the tangential direction of the circular passage section.

As illustrated in FIG. 2, the fuel gas connecting portion 62 is connected to the side wall 69 of the tubular main body portion 66. More specifically, the fuel gas connecting portion 62 is connected to the side wall 69 at a position on a side closer to the first end 67 than a position where the fuel offgas connecting portion 64 is connected to the side wall 69. One end of the fuel gas connecting portion 62 is a fuel gas inlet portion 63 formed on the side wall 69. The fuel gas inlet portion 63 causes the fuel gas flowing through the fuel gas supply passage 31 to flow into the fuel gas passage portion 72. The fuel gas flowing into the fuel gas passage portion 72 flows toward the second end 61 side and joins with the fuel offgas in the confluence passage portion 74.

The fluid confluence joint 60 further includes a step 76. The step 76 is formed at a position between the fuel offgas inlet portion 65 and the fuel gas inlet portion 63 in the main body portion 66 in the facing direction where the first end 67 faces the second end 61. The step 76 is formed over the whole circumference of the inner wall 77 of the main body portion 66. The step 76 has a surface facing toward the second end 61 side. The step 76 is formed by reducing the passage sectional area of the main body portion 66 on the fuel gas passage portion 72 side to be smaller than the passage sectional area of the main body portion 66 on the confluence passage portion 74 side.

Figure 4:
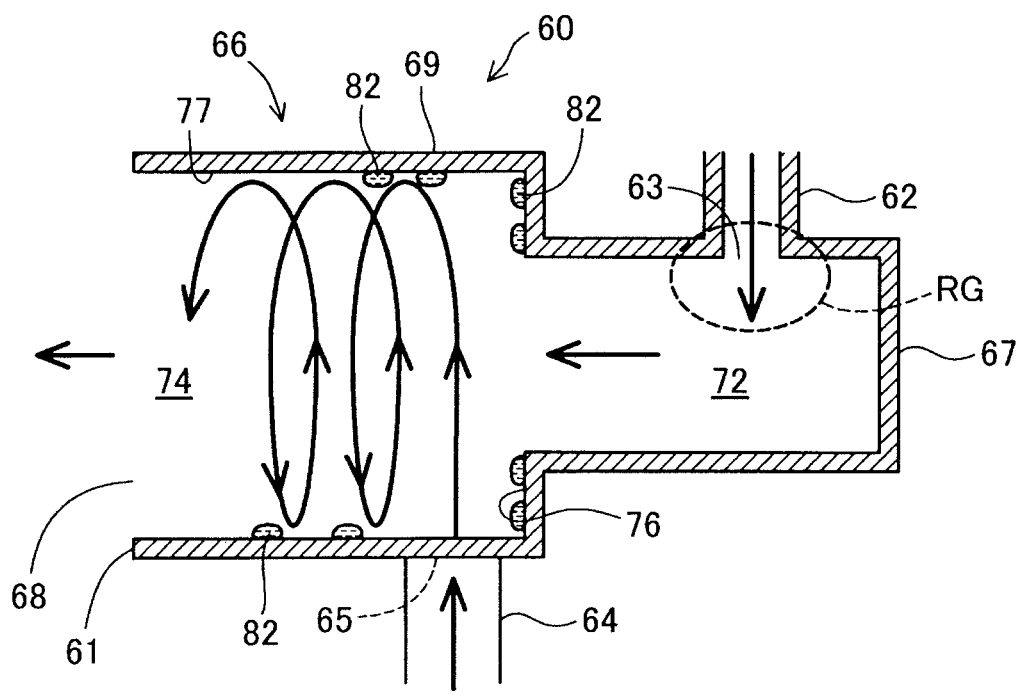
FIG. 4 is a view to further describe the fluid confluence joint.

FIG. 4 is a view to further describe the fluid confluence joint 60. FIG. 4 is a schematic view when the fluid confluence joint 60 is cut along a plane passing through the central axis of the confluence passage portion 74 and parallel with the central axis. In FIG. 4, a flow of the gas flowing through the fluid confluence joint 60 is indicated by an arrow. As described above, the fuel offgas flowing from the fuel offgas inlet portion 65 swirls along the inner wall 77 and flows toward the second end 61. In a case where liquid water 82 is included in the fuel offgas, the liquid water 82 is pressed against the inner wall 77 and attached to the inner wall 77. In cases where the vehicle equipped with the fuel cell system 10 is placed on an inclined surface, when the liquid water 82 on the inner wall 77 is to move to the fuel gas inlet portion 63 side, the liquid water directed toward the fuel gas inlet portion 63 can be caught by the step 76. Accordingly, it is possible to reduce a possibility that the liquid water enters an entry region RG for the fuel gas, including the fuel gas inlet portion 63. This makes it possible to restrain such a situation that the liquid water stays in the entry region RG or the liquid water thus staying freezes up to prevent the supply of the fuel gas to the fuel cell 12. Hereby, it is possible to stably perform power generation by the fuel cell 12.

B. Second Embodiment

Figure 5:
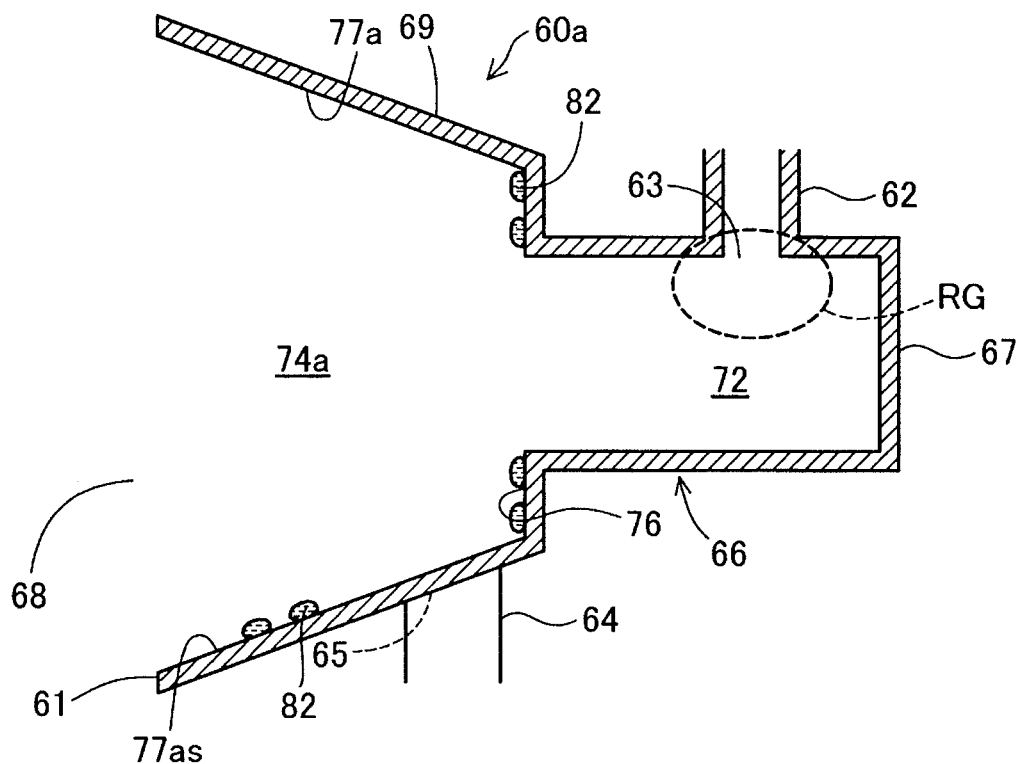
FIG. 5 illustrates a fluid confluence joint of a second embodiment.

FIG. 5 illustrates a fluid confluence joint 60*a* of a second embodiment. The difference between the fluid confluence joint 60*a* of the second embodiment and the fluid confluence joint 60 of the first embodiment as illustrated in FIG. 4 is the shape of a confluence passage portion 74*a*. Since the other configurations of the second embodiment are the same as those in the first embodiment, the same reference sign as used in the first embodiment is assigned to a similar constituent and a description thereof is omitted.

The confluence passage portion 74*a* has a shape in which a passage diameter increases toward the second end 61. That is, the passage of the confluence passage portion 74*a* has a truncated cone shape in which the second end 61 serves as the bottom face. In a case where the vehicle equipped with the fuel cell system 10 is placed on a horizontal plane, a wall 77*as* on a gravitational side (the lower side on the plane of paper) in an inner wall 77*a* of the confluence passage portion 74*a* is inclined to be placed downward as it extends toward the second end 61. Hereby, the liquid water 82 attached to the wall 77*as* can be promoted to move to the second end 61 by gravity, thereby making it possible to further reduce the possibility that the liquid water 82 enters the entry region RG.

C. Third Embodiment

Figure 6:
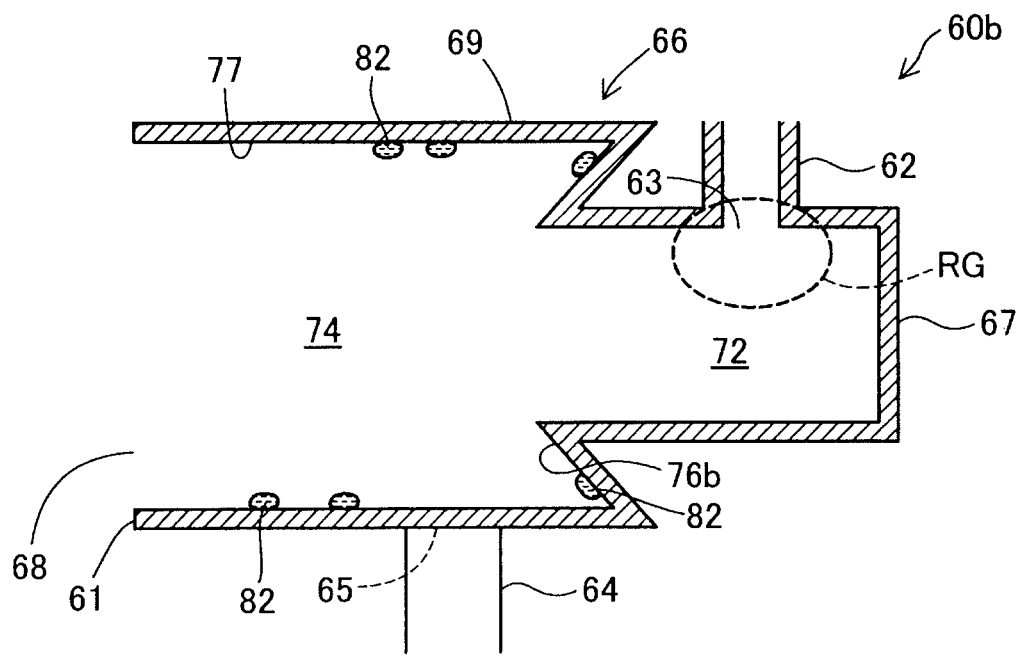
FIG. 6 illustrates a fluid confluence joint of a third embodiment.

FIG. 6 illustrates a fluid confluence joint 60*b* of a third embodiment. The difference between the fluid confluence joint 60*b* of the third embodiment and the fluid confluence joint 60 of the first embodiment as illustrated in FIG. 4 is the shape of a step 76*b*. Since the other configurations of the third embodiment are similar to those in the first embodiment, the same sign as used in the first embodiment is assigned to a similar constituent and a description thereof is omitted.

The step 76b is inclined toward the second end 61 as it extends in the inward direction of the main body portion 66. That is, the step 76b extends inwardly in the main body portion 66 toward the second end 61 side from the inner wall of the main body portion 66. Hereby, it is possible to restrain the liquid water 82 from climbing over the step 76b, thereby making it possible to further reduce the possibility that the liquid water 82 enters the entry region RG.

D. Fourth Embodiment

Figure 7:
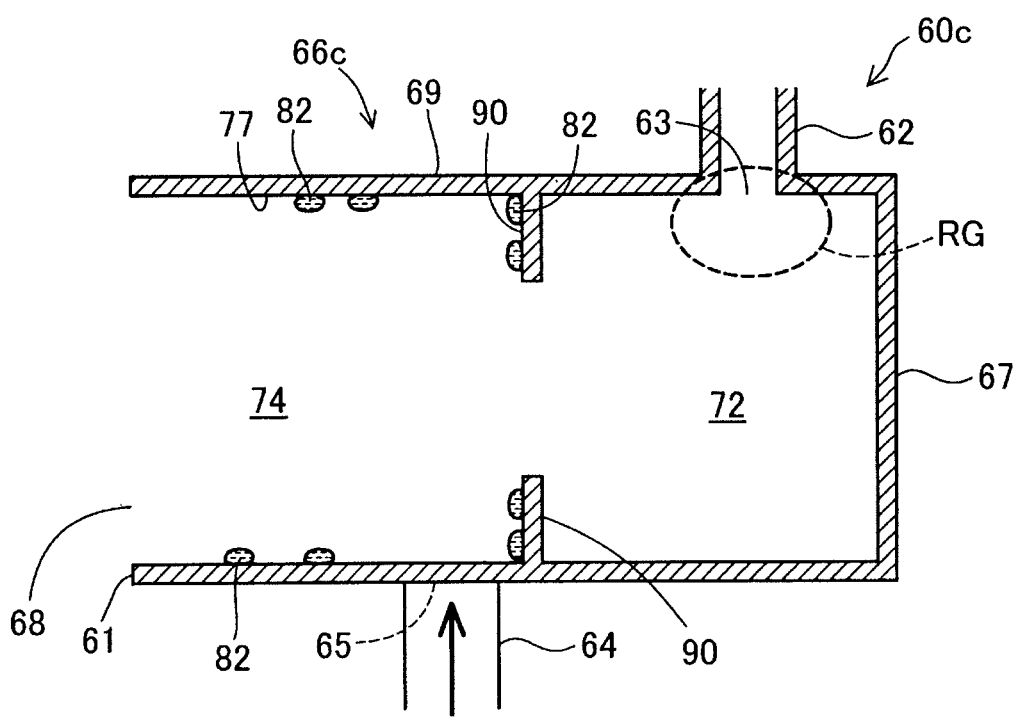
FIG. 7 illustrates a fluid confluence joint of a fourth embodiment.

FIG. 7 illustrates a fluid confluence joint 60c of a fourth embodiment. The fluid confluence joint 60c of the fourth embodiment is different from the fluid confluence joint 60 of the first embodiment as illustrated in FIG. 4 in that, instead of the step 76, a partition wall 90 functions as an entry restraint portion configured to restrain the liquid water from entering the entry region RG, and the inside diameter of a main body portion 66c is uniform from the first end 67 to the second end 61. Since the other configurations of the fourth embodiment are similar to those in the first embodiment, the same sign as used in the first embodiment is assigned to a similar constituent and a description thereof is omitted.

The partition wall 90 is formed at a position between the fuel offgas inlet portion 65 and the fuel gas inlet portion 63 in the main body portion 66c in the facing direction where the first end 67 faces the second end 61. The partition wall 90 projects inwardly from the inner wall 77 of the main body portion 66c. The partition wall 90 is formed over the whole circumference of the inner wall 77. The partition wall 90 has a tonic shape having a uniform thickness. With the present embodiment, the liquid water 82 directed toward the fuel gas inlet portion 63 can be caught by the partition wall 90, thereby making it possible to reduce the possibility that the liquid water enters the entry region RG. This makes it possible to restrain such a situation that the liquid water stays in the entry region RG or the liquid water thus staying freezes up to prevent the supply of the fuel gas to the fuel cell 12. Hereby, it is possible to stably perform power generation by the fuel cell 12.

E. Fifth Embodiment

Figure 8:
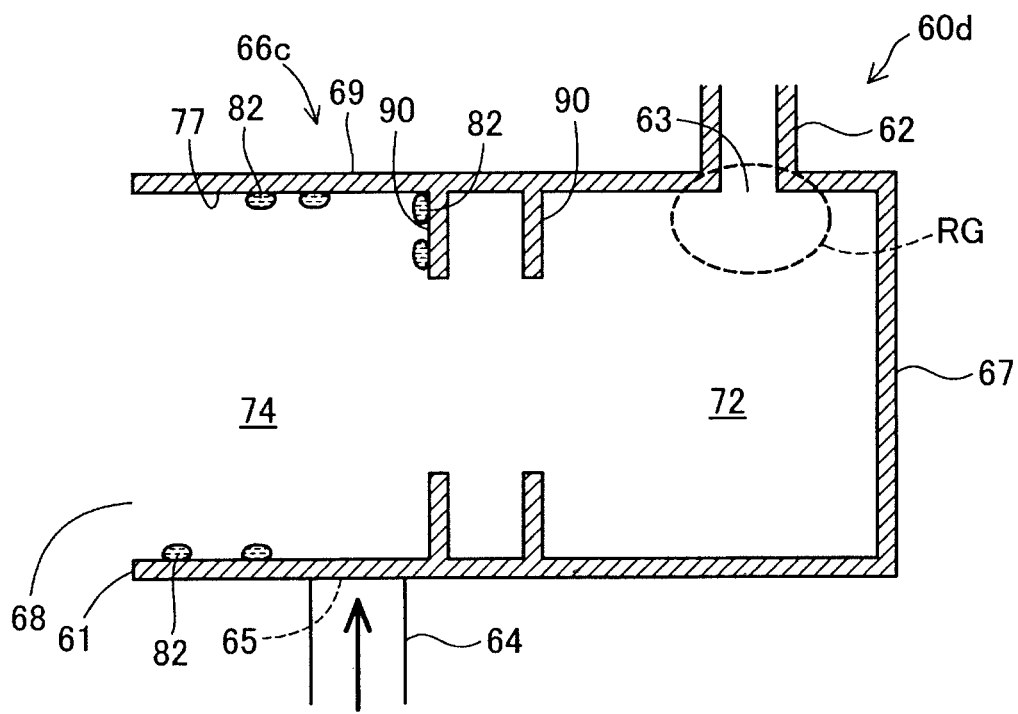
FIG. 8 illustrates a fluid confluence joint of a fifth embodiment.

FIG. 8 illustrates a fluid confluence joint 60d of a fifth embodiment. The fluid confluence joint 60d of the fifth embodiment is different from the fluid confluence joint 60c of the fourth embodiment as illustrated in FIG. 7 in that a plurality of partition walls 90 is formed over the whole circumference of the inner wall 77. Since the other configurations of the fifth embodiment are similar to those in the fourth embodiment, the same sign as used in the fourth embodiment is assigned to a similar constituent and a description thereof is omitted. In the present embodiment, two partition walls 90 are formed. The two partition walls 90 are disposed at an interval in the direction along the central axis of the confluence passage portion 74. In the fifth embodiment, since the two partition walls 90 are provided, it is possible to further reduce the possibility that the liquid water in the confluence passage portion 74 enters the entry region RG.

F. Sixth Embodiment

Figure 9:
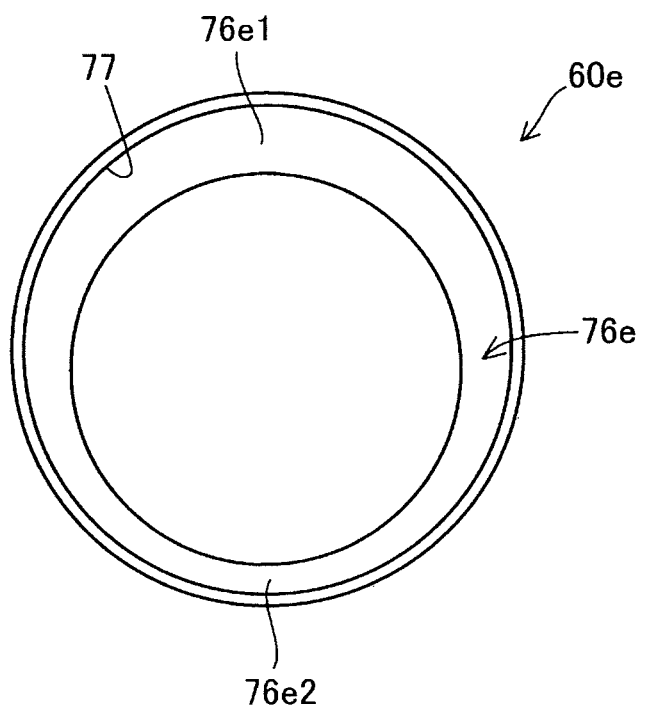
FIG. 9 illustrates a fluid confluence joint of a sixth embodiment.

FIG. 9 illustrates a fluid confluence joint 60e of a sixth embodiment. FIG. 9 is a schematic view of the fluid confluence joint 60e viewed from the second end 61 side. The fluid confluence joint 60e of the sixth embodiment is different from the fluid confluence joint 60 of the first embodiment as illustrated in FIG. 4 in that the dimension of a step 76e partially changes. Since the other configurations of the sixth embodiment are similar to those in the first embodiment, the same sign as used in the first embodiment is assigned to a similar constituent and a description thereof is omitted. The step 76e is configured such that a first part 76e1 on the upper side on the plane of paper has a dimension larger than that of a second part 76e2 on the lower side on the plane of paper. The dimension of the step 76e means a projection amount to project inwardly from the inner wall 77. It is preferable that the first part 76e1 of the step 76e with a large dimension be disposed in a part where the liquid water 82 easily gathers. The part where the liquid water 82 easily gathers may be, for example, a gravitational side or a region where the fuel offgas flowing from the fuel offgas inlet portion 65 flows and first hits the inner wall 77 in the circumferential direction of the main body portion 66. Hereby, since the dimension of the part, of the step 76e, where the liquid water 82 easily gathers can be made large, it is possible to further reduce the possibility that the liquid water in the confluence passage portion 74 enters the entry region RG.

G. Modification

G-1. First Modification

In each of the above embodiments, in a case where the vehicle equipped with the fuel cell system 10 is placed on a horizontal plane (in a basic displacement state), the fluid confluence joint 60 to 60e is disposed such that the central axis of the confluence passage portion 74, 74e is generally horizontal. However, each of the embodiments is not limited to this. For example, in the basic displacement state, the fluid confluence joint 60 to 60e may be disposed such that the central axis of the confluence passage portion 74, 74e is inclined. Even in this case, the fluid confluence joint 60 to 60e has the step 76, 76b, 76e or the partition wall 90, and therefore, it is possible to reduce the possibility that the liquid water in the confluence passage portion 74, 74a enters the entry region RG for the fuel gas.

G-2. Second Modification

In each of the above embodiments, the passage section of the fuel gas passage portion 72 is generally circular. However, the passage section is not limited to this and may have other shapes. For example, the passage section of the fuel gas passage portion 72 may be rectangular.

G-3. Third Modification

Two or more embodiments from the above embodiments may be combined with each other. For example, the fluid confluence joint 60 (FIG. 4) of the first embodiment may have the partition wall 90 (FIG. 7) of the fluid confluence joint 60c in addition to the step 76.

G-4. Fourth Modification

Similarly to the step 76b (FIG. 6) of the third embodiment, the partition wall 90 (see FIGS. 7, 8) of the fourth embodiment or the fifth embodiment may be inclined toward the second end 61 as it extends in an inward direction of the main body portion 66c. With this configuration, it is possible to restrain the liquid water in the confluence passage portion 74 from climbing over the partition wall 90, thereby making it possible to further reduce the possibility that the liquid water enters the entry region RG. Further, the partition wall 90 (FIG. 7, FIG. 8) in the fourth embodiment or the fifth embodiment may partially have a part with a different projection amount. Similarly to the fluid confluence joint 60*e* (FIG. 9) of the sixth embodiment, it is preferable that a part, of the partition wall 90, that has a large projection amount be disposed in a part where the liquid water 82 easily gathers. Hereby, since the projection amount of the part, of the partition wall 90, where the liquid water 82 easily gathers can be made large, it is possible to further reduce the possibility that the liquid water in the confluence passage portion 74 enters the entry region RG.

G-5. Fifth Modification

In each of the first to third embodiments and the sixth embodiment, a plurality of steps 76, 76*b*, 76*e* may be formed. This makes it possible to further reduce the possibility that the liquid water enters the entry region RG for the fuel gas.

Note that this disclosure is not limited to the embodiments and the modifications and includes various modifications. For example, the above embodiments are described in detail to describe the disclosure clearly and are not necessarily limited to one including all the configurations described above. Further, a part of the configuration of a given embodiment can be replaced with the configuration of any of the modifications, and the configuration of any of the modifications can be added to the configuration of a given embodiment. Further, addition, deletion, or replacement of any of the modifications can be performed in terms of a part of the configuration of each of the embodiments.

What is claimed is:

1. A fluid confluence joint at which a fuel gas to be supplied to a fuel cell joins with a fuel offgas discharged from the fuel cell, the fluid confluence joint comprising a main body portion including a first end and a second end facing the first end, the second end having an opening formed to guide a fuel mixture of the fuel gas and the fuel offgas, the main body portion including (i) a confluence passage portion in which the fuel gas joins with the fuel offgas, the confluence passage portion having a circular passage section, and (ii) a fuel gas passage portion disposed on a side closer to the first end than the confluence passage portion, wherein the main body portion includes:

(a) a fuel offgas inlet portion connected to the confluence passage portion tangentially to an inner circumferential wall of the confluence passage portion and offset from a central axis of the confluence passage portion, the fuel offgas inlet portion being configured to cause the fuel offgas to flow into the confluence passage portion along a tangential direction of the circular passage section so that the fuel offgas swirls in the confluence passage portion;

(b) a fuel gas inlet portion connected to the fuel gas passage portion and configured to cause the fuel gas to flow into the fuel gas passage portion in a direction substantially parallel to a direction of flow of the fuel offgas through the fuel offgas inlet portion; and (c) at least one step formed over a whole circumference of an inner wall of the main body portion by reducing a passage sectional area of the main body portion along the entire fuel gas passage portion to be smaller than a passage sectional area of the main body portion along the entire confluence passage portion, the at least one step being formed at a position between the fuel offgas inlet portion and the fuel gas inlet portion in the main body portion in a facing direction where the first end faces the second end.

2. The fluid confluence joint according to claim 1, wherein the confluence passage portion has a shape in which a passage diameter increases toward the second end.

3. The fluid confluence joint according to claim 1, wherein the at least one step includes a plurality of steps.

4. The fluid confluence joint according to claim 1, wherein the at least one step is inclined toward the second end as the at least one step extends in an inward direction of the main body portion.

5. The fluid confluence joint according to claim 1, wherein a dimension of a part of the at least one step is different from a dimension of another part of the at least one step.

6. The fluid confluence joint according to claim 1, comprising:

a fuel gas connecting portion configured to be connected to a fuel gas supply passage and connected to the fuel gas inlet portion; and a fuel offgas connecting portion configured to be connected to a fuel offgas circulation passage and connected to the fuel offgas inlet portion.

7. The fluid confluence joint according to claim 1, wherein the fuel gas inlet portion is formed through an outer circumferential wall of the main body portion.

* * * * *